United States Patent

Miki

(10) Patent No.: US 10,424,811 B2
(45) Date of Patent: Sep. 24, 2019

(54) SOLID ELECTROLYTE MATERIAL, SOLID ELECTROLYTE LAYER, FLUORIDE ION BATTERY, AND METHOD FOR PRODUCING FLUORIDE ION BATTERY

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHI, Toyota (JP)

( * ) Notice: Subject to any disclaimer, the term of this patent is extended or adjusted under 35 U.S.C. 154(b) by 21 days.

(21) Appl. No.: 15/701,841

(22) Filed: Sep. 12, 2017

(65) Prior Publication Data

US 2018/0131037 A1  May 10, 2018

(30) Foreign Application Priority Data

Nov. 8, 2016 (JP) ................ 2016-218261

(51) Int. Cl.
| | |
|---|---|
| H01M 10/05 | (2010.01) |
| B28B 3/02 | (2006.01) |
| H01M 10/0562 | (2010.01) |
| H01M 10/058 | (2010.01) |
| H01M 10/054 | (2010.01) |

(52) U.S. Cl.
CPC ......... *H01M 10/0562* (2013.01); *B28B 3/025* (2013.01); *H01M 10/054* (2013.01); *H01M 10/058* (2013.01)

(58) Field of Classification Search
None
See application file for complete search history.

(56) References Cited

U.S. PATENT DOCUMENTS

| | | | |
|---|---|---|---|
| 4,352,869 A | 10/1982 | Mellors | |
| 2014/0030559 A1* | 1/2014 | Yazami | ............ H01M 4/38 429/50 |

FOREIGN PATENT DOCUMENTS

| | | |
|---|---|---|
| JP | S57-132677 A | 8/1982 |
| JP | 2013-145758 A | 7/2013 |
| WO | 2007-146453 A2 | 12/2007 |

OTHER PUBLICATIONS

Carine Rongeat et al., "Solid electrolytes for fluoride ion batteries: Ionic conductivity in polycrystalline tysonite-type fluorides." ACS Applied Materials & Interfaces, Jan. 20, 2014, vol. 6, pp. 2103-2110. (Year: 2014).*

Carine Rongeat et al. "Solid Electrolytes for Fluoride Ion Batteries: Ionic Conductivity in Polycrystalline Tysonite-Type Fluorides". ACS Applied Materials & Interfaces, Jan. 20, 2014, vol. 6, pp. 2103-2110.

* cited by examiner

*Primary Examiner* — Jonathan Crepeau
*Assistant Examiner* — Angela J Martin
(74) *Attorney, Agent, or Firm* — Oliff PLC

(57) ABSTRACT

An object of the present disclosure is to provide a solid electrolyte material with excellent ion conductivity at a low temperature. The present disclosure achieves the object by providing a solid electrolyte material to be used for a fluoride ion battery, the solid electrolyte material comprising: a solid electrolyte particle including a crystal phase, that has a Tysonite structure and contains an F element, as a main phase; and CsF; and the CsF content in the solid electrolyte material is 50% by weight or less.

7 Claims, 6 Drawing Sheets

SOLID ELECTROLYTE MATERIAL, SOLID ELECTROLYTE LAYER, FLUORIDE ION BATTERY, AND METHOD FOR PRODUCING FLUORIDE ION BATTERY

TECHNICAL FIELD

The present disclosure relates to a solid electrolyte material that has excellent fluoride ion conductivity at a relatively low temperature such as approximately 80° C.

BACKGROUND ART

As high-voltage and high-energy density batteries, for example, Li ion batteries are known. The Li ion battery is a cation-based battery utilizing a reaction between a Li ion and a cathode active material and a reaction between a Li ion and an anode active material. Meanwhile, as anion-based batteries, fluoride ion batteries utilizing a reaction of fluoride ions (fluoride anions) are known.

For example, Non-Patent Literature 1 discloses a fluoride ion conductive solid electrolyte having a Tysonite structure. Also, Patent Literature 1 discloses a liquid fluoride ion battery using a liquid electrolyte that includes a solvent and fluoride salt.

CITATION LIST

Patent Literature

Patent Literature 1: Japanese Patent Application Laid-Open (JP-A) No. 2013-145758
Non-Patent Literature 1: Carine Rongeat et al., "Solid Electrolytes for Fluoride Ion Batteries: Ionic Conductivity in Polycrystalline Tysonite-Type Fluorides", ACS Appl. Mater. Interfaces 2014, 6, 2103-2110, Published Jan. 20, 2014

SUMMARY OF DISCLOSURE

Technical Problem

Now, although conventional fluoride ion batteries function as high-capacity batteries at a high temperature such as 200° C. or more, it is difficult to function as batteries in a condition at a low temperature. A factor thereof is that the fluoride ion conductivity of the solid electrolyte is low in the condition at a low temperature.

The present disclosure has been made in view of the above circumstances, and a main object thereof is to provide a solid electrolyte material that has excellent fluoride ion conductivity at a relatively low temperature such as approximately 80° C.

Solution to Problem

In order to achieve the object, the present disclosure provides a solid electrolyte material to be used for a fluoride ion battery, the solid electrolyte material comprising: a solid electrolyte particle including a crystal phase, that has a Tysonite structure and contains an F element, as a main phase; and CsF; and the CsF content in the solid electrolyte material is 50% by weight or less.

According to the present disclosure, inclusion of the specific amount of the CsF may allow a solid electrolyte material to have excellent fluoride ion conductivity at a relatively low temperature.

In the present disclosure, the crystal phase preferably has a composition represented by $Ln_{1-x}M_xF_{3-x}$, in which Ln is a lanthanoid metal, M is an alkali earth metal, and x satisfies $0 \leq x \leq 0.2$.

In the present disclosure, the CsF content in the solid electrolyte material is preferably in a range of 20% by weight to 30% by weight.

The present disclosure provides a solid electrolyte layer to be used for a fluoride ion battery, the solid electrolyte layer comprising the above described solid electrolyte material.

According to the present disclosure, the solid electrolyte layer comprises the above described solid electrolyte material so as to allow a solid electrolyte layer to have excellent fluoride ion conductivity at a relatively low temperature.

The present disclosure provides a fluoride ion battery comprising: a cathode layer, an anode layer, and a solid electrolyte layer formed between the cathode layer and the anode layer; wherein the solid electrolyte layer contains the above described solid electrolyte material.

According to the present disclosure, the solid electrolyte layer contains the above described solid electrolyte material so as to allow a fluoride ion battery to have excellent fluoride ion conductivity at a relatively low temperature.

The present disclosure provides a method for producing a fluoride ion battery, the method comprising: a mixing step of mixing a solid electrolyte particle including a crystal phase, that has a Tysonite structure and contains an F element, as a main phase, and CsF, to obtain a solid electrolyte material; and a pressing step of pressing the solid electrolyte material to obtain a solid electrolyte layer; wherein the CsF content in the solid electrolyte material is 50% by weight or less.

According to the present disclosure, the method comprises the above described mixing step, so that a fluoride ion battery with excellent fluoride ion conductivity at a relatively low temperature may be obtained.

In the present disclosure, a heat treatment is preferably performed in the pressing step.

Advantageous Effects of Disclosure

The solid electrolyte material of the present disclosure exhibits effects such as excellent fluoride ion conductivity at a relatively low temperature.

DESCRIPTION OF EMBODIMENTS

The solid electrolyte material, the solid electrolyte layer, the fluoride ion battery, and the method for producing the fluoride ion battery of the present disclosure are hereinafter described in detail.

A. Solid Electrolyte Material

Figure 1A:
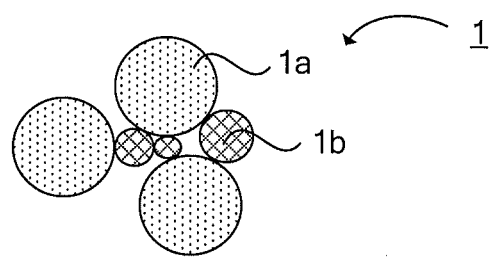
FIGS. 1A and 1B are schematic cross-sectional views illustrating an example and additional example of the solid electrolyte material of the present disclosure.
Figure 1B:
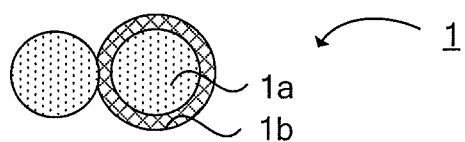

The solid electrolyte material of the present disclosure is described with reference to drawings. FIGS. 1A and 1B are schematic cross-sectional views illustrating an example and additional example of the solid electrolyte material of the present disclosure. Solid electrolyte material 1 illustrated in FIGS. 1A and 1B comprises solid electrolyte particle 1a including a crystal phase, that has a Tysonite structure and contains an F element, as a main phase; and CsF 1b; and the CsF 1b content in solid electrolyte material 1 is 50% by weight or less. In solid electrolyte material 1, CsF 1b is present between solid electrolyte particles 1a (in the grain boundary). Solid electrolyte material 1 may, for example, be a material in which solid electrolyte particles 1a and granular CsF 1b are mixed as illustrated in FIG. 1A, and for example, CsF 1b may coat solid electrolyte particle 1a as illustrated in FIG. 1B.

Figure 2:
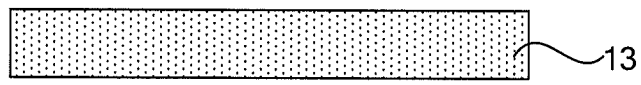
FIG. 2 is a schematic cross-sectional view illustrating an example of the solid electrolyte layer of the present disclosure.
Figure 3:
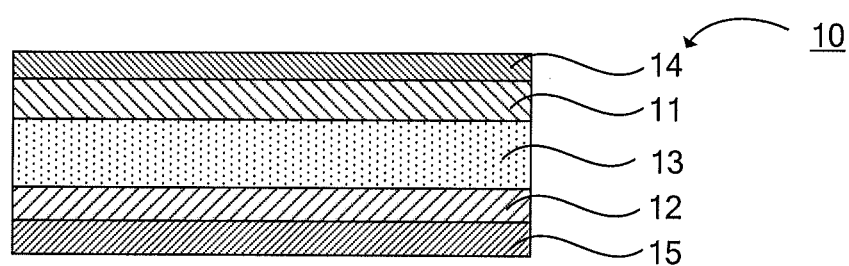
FIG. 3 is a schematic cross-sectional view illustrating an example of the fluoride ion solid battery of the present disclosure.

The solid electrolyte material of the present disclosure is the material to be used for a fluoride ion battery. Also, the solid electrolyte material of the present disclosure is preferably used in a solid electrolyte layer. FIG. 2 is a schematic cross-sectional view illustrating an example of the solid electrolyte layer including the solid electrolyte material of the present disclosure, and FIG. 3 is a schematic cross-sectional view illustrating an example of the fluoride ion battery comprising the solid electrolyte layer in FIG. 2. Fluoride ion battery 10 illustrated in FIG. 3 comprises cathode layer 11, anode layer 12, and solid electrolyte layer 13 formed between cathode layer 11 and anode layer 12. Also, fluoride ion battery 10 usually comprises cathode current collector 14 for collecting currents of cathode layer 11, and anode current collector 15 for correcting currents of anode layer 12.

According to the present disclosure, inclusion of the specific amount of the CsF may allow a solid electrolyte material to have excellent fluoride ion conductivity at a relatively low temperature.

The reason therefor is presumed as follows. The CsF has high ionicity and has properties to facilitate the dissocination of fluoride ions. Accordingly, when the solid electrolyte material is used for a solid electrolyte layer, the presence of the CsF between the solid electrolyte particles (mixed in the grain boundary) presumably allows the fluoride ion conductivity that lies along the grain boundary of the solid electrolyte particles to improve specifically.

Here, generally, conduction of elements (ions) in the entire solid electrolyte layer including the solid electrolyte particle may be divided into the conduction in the particle (bulk conduction) and the conduction in the interface of the particles (grain boundary conduction). Also, in fluoride ion batteries, upon the conduction of fluoride ions in the solid electrolyte layer, it is presumed that the bulk conduction tends to dominate a high temperature region, and the grain boundary conduction tends to dominate a low temperature region. In other words, it is presumed that, in a high temperature region, the bulk conduction gives large effect and the grain boundary conduction gives small effect to the conduction of fluoride ions in the solid electrolyte layer (dispersion speed). Meanwhile, it is presumed that, in a low temperature region, the grain boundary conduction gives large effect and the bulk conduction gives small effect to the conduction of the fluoride ions.

Figure 4:
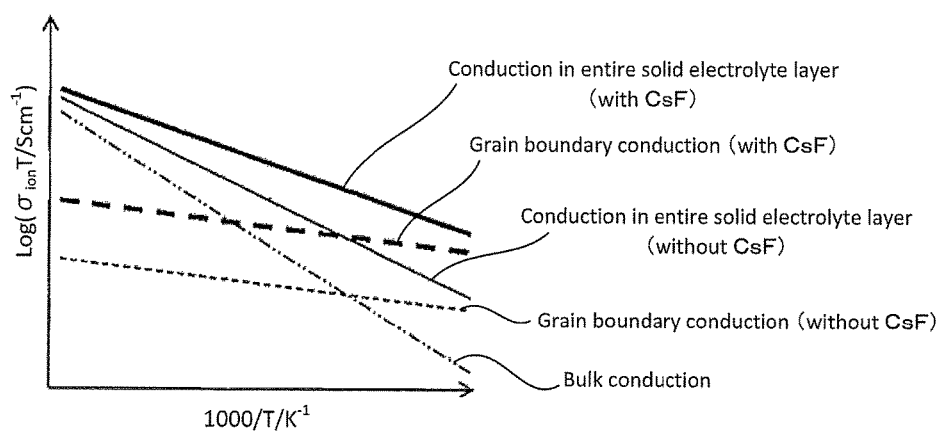
FIG. 4 is a chart explaining the presumable mechanism.

In the present disclosure, inclusion of the specific amount of the CsF may presumably allow the boundary conduction of fluoride ions to improve as shown in FIG. 4. Thereby, in the low temperature region where the effect of the grain boundary conduction is large and the effect of the bulk conduction is small, fluoride ion conductivity in the entire solid electrolyte layer may presumably be improved. Meanwhile, in the high temperature region where the effect of the bulk conduction is large and the effect of the grain boundary conduction is small, the fluoride ion conductivity in the entire solid electrolyte layer presumably does not differ much depending on the presence of the CsF. Incidentally, FIG. 4 is a chart explaining the tendency of the fluoride ions in the conduction in the entire solid electrolyte layer, in the grain boundary conduction, and in the bulk conduction, using an Arrhenius plot.

In the present disclosure, the addition of the CsF to the above described solid electrolyte particle may allow the fluoride ion conductivity to be improved. Meanwhile, the effect of improvement in the fluoride ion conductivity may also be considered as the effect of decreasing the activation energy of the fluoride ion conduction. The activation energy may be expressed by the incline of the Arrhenius plot. As shown in FIG. 4, when the CsF is included, the incline of the Arrhenius plot is smaller than when the CsF is not included. It suggests that the addition of the CsF decreases the activation energy. Incidentally, when the incline of the bulk conduction is compared to the incline of the grain boundary conduction (when the CsF is included and not included), it is suggested that the activation energy of the grain boundary conduction is smaller than the activation energy of the bulk conduction.

Incidentally, Non-Patent Literature 1 discloses a technique to improve the ion conductivity in a fluoride ion conductive solid electrolyte having a Tysonite structure by decreasing the grain boundary resistance using a method of reducing the number of the grain boundary by enhancing the grain growth caused by single crystallization and heat treatment.

However, in the technique shown in Non-Patent Literature 1, a heat treatment at a high temperature is necessary. Also, a technique to produce a single crystal without a grain boundary (such as the adjustment of the strict conditions for precipitation) is necessary. Accordingly, the technique shown in Non-Patent Literature 1 needs enormous cost for processing. Also, it is concerned that a resistance layer may be formed by the chemical reaction of the solid electrolyte with the other materials included in the battery upon the heat treatment at a high temperature.

In contrast, in the present disclosure, the fluoride ion conductivity may be improved by mixing the above described solid electrolyte particle with the CsF.

The solid electrolyte material of the present disclosure is hereinafter described in each constitution.

1. Solid Electrolyte Particle

The solid electrolyte particle in the present disclosure includes a crystal phase that has a Tysonite structure and contains an F element as a main phase. The solid electrolyte that has the above crystal phase as a main phase tends to have low ion conductivity at a comparatively low temperature, and thus the effect by the present disclosure may be easily exhibited therein. Also, the solid electrolyte that has the above described crystal phase also has an advantage that the stably usable voltage range therefor is wide.

"The solid electrolyte particle includes a crystal phase that has a Tysonite structure and contains an F element as a main phase" means that the proportion of the crystal phase that has a Tysonite structure and contains an F element is the most among the crystal phases in the solid electrolyte particle. The solid electrolyte particle may, for example, include only the crystal phase that has a Tysonite structure and contains an F element, and may further include additional crystal phase. Examples of the additional crystal phase may include a fluoride that has a fluorite structure. Whether the solid electrolyte particle includes a crystal phase that has a Tysonite structure and contains an F element as a main phase may, for example, be confirmed by an X-ray diffraction measurement (XRD measurement).

The proportion of the crystal phase that has a Tysonite structure and contains an F element in the solid electrolyte is, for example, preferably 70 mol % or more, more preferably 80 mol % or more, and further preferably 90 mol % or more. Also, the proportion of the specific crystal phase may be, for example, 100 mol %. The proportion of the specific crystal phase may be, for example, measured by a Raman spectroscopy, NMR, and XPS.

The specific crystal phase preferably has, for example, a composition represented by $Ln_{1-x}M_xF_{3-x}$, in which Ln is a lanthanoid metal, M is an alkali earth metal, and x satisfies $0 \leq x \leq 0.2$.

The Ln is a lanthanoid metal. In particular, the Ln is preferably at least one kind of La, Ce, Sm, Nd, Dy, Pr, Eu, and Gd, and preferably contains at least La. The proportion of La in the entire Ln may be, for example, 50 mol %, may be 70 mol % or more, may be 90 mol % or more, and may be 100 mol %. It is further preferable that the Ln is only La.

The M is an alkali earth metal. The M is preferably at least one kind of Ba, Ca, Sr, and Mg, and more preferably contains at least Ba. The proportion of Ba in the entire M may be, for example, 50 mol %, may be 70 mol % or more, may be 90 mol % or more, and may be 100 mol %. It is further preferable that the M is only Ba.

The value of x in the composition formula represented by $Ln_{1-x}M_xF_{3-x}$ is, usually 0 or more, may be larger than 0, and may be 0.05 or more. Also, the value of the x is, usually 2 or less, and may be 0.15 or less. In the present disclosure, for example, it may be x=0.1.

The solid electrolyte particle in the present disclosure preferably has peaks at the positions of $2\theta=24.34°\pm0.50°$, $24.88°\pm0.50°$, $27.72°\pm0.50°$, $28.66°\pm0.50°$, $34.89°\pm0.50°$, $40.23°\pm0.50°$, $43.6°\pm0.50°$, $44.73°\pm0.50°$, $50.48°\pm0.50°$, $52.39°\pm0.50°$, and $64.29°\pm0.50°$. These peak positions are the peak positions based on the later described $La_{0.9}Ba_{0.1}F_{2.9}$, and the range of $\pm0.50°$ is set, so as to determine the crystal phase similar to that of $La_{0.9}Ba_{0.1}F_{2.9}$. Also, the range of the peak positions may be $\pm0.30°$, and may be $\pm0.10°$.

The average particle size ($D_{50}$) of the solid electrolyte particle is, for example, in a range of 0.1 μm to 50 μm, and preferably in a range of 1 μm to 20 μm. The average particle size ($D_{50}$) of the solid electrolyte particle may be, for example, measured by the result of the particle distribution measurement using a laser diffraction scattering method.

Examples of the method for producing the solid electrolyte particle may include a ball mill treatment. Specific conditions for the ball mill treatment may be appropriately selected depending on the intended specific crystal phase.

2. CsF

The solid electrolyte material of the present disclosure comprises CsF. The CsF content in the solid electrolyte material is, usually more than 0% by weight, more preferably 10% by weight or more, and further preferably 20% by weight or more. Also, the CsF content is, usually 50% by weight or less, and more preferably 30% by weight or less. The reason therefor is to improve the grain boundary conduction of fluoride ions.

Also, the CsF may be, for example, partially dissolved in the interface with the solid electrolyte particle.

The CsF is, in the solid electrolyte material, usually present in between the solid electrolyte particles (in the grain boundary). In the present disclosure, for example, the CsF in a granular shape may be disposed in between the solid electrolyte particles, and also, for example, the solid electrolyte particle may be coated with the CsF. When the CsF coats the solid electrolyte particle, the coverage of the CsF on the surface of the solid electrolyte particle may be, for example, 50% or more, and may be 70% or more. Also, the coverage of the CsF may be, for example, 100%. Examples of the method for measuring the coverage of the CsF may include a transmission electron microscope (TEM) and X-ray photoelectron spectroscopy (XPS).

Also, when the CsF coats the solid electrolyte particle, the thickness of the CsF may be, for example, 1 nm or more, and may be 100 nm or more. Also, the thickness of the CsF may be, for example, 500 nm or less, and may be 50 nm or less. The thickness of the CsF is usually the average thickness. Also, examples of the method for measuring the thickness of the fluoride may include a transmission electron microscope (TEM).

3. Solid Electrolyte Material

The solid electrolyte material of the present disclosure comprises the solid electrolyte particle and the CsF. Examples of the applicable method for producing the solid electrolyte material may include a method described in the section "D. Method for producing fluoride ion battery (1) Mixing step".

It is preferable that the solid electrolyte material of the preset disclosure is used for the solid electrolyte layer in a fluoride ion battery.

B. Solid Electrolyte Layer

The solid electrolyte layer of the present disclosure is a solid electrolyte layer to be used for a fluoride ion battery, and the layer comprises the solid electrolyte material described in the section "A. Solid electrolyte material" above.

According to the present disclosure, the solid electrolyte layer comprises the above described solid electrolyte material, so as to allow a solid electrolyte layer to have excellent fluoride ion conductivity at a relatively low temperature.

The solid electrolyte material to be used for the solid electrolyte layer is in the same contents as those described above; thus, the description herein is omitted. The thickness of the solid electrolyte layer greatly varies with the constitution of the battery, and thus not limited.

C. Fluoride Ion Battery

The fluoride ion battery of the present disclosure is a fluoride ion battery comprising a cathode layer, an anode layer, and a solid electrolyte layer formed between the cathode layer and the anode layer, wherein the solid electrolyte layer contains the above described solid electrolyte material.

According to the present disclosure, the solid electrolyte layer contains the above described solid electrolyte material, so as to allow a fluoride ion battery to have excellent fluoride ion conductivity at a relatively low temperature.

The fluoride ion battery of the present disclosure is hereinafter described in each constitution.

1. Solid Electrolyte Layer

The solid electrolyte layer in the present disclosure is in the same contents as those described in the section "B. Solid electrolyte layer" above; thus, the description herein is omitted.

2. Cathode Layer

The cathode layer in the present disclosure is a layer that contains at least a cathode active material. Also, the cathode layer may further contain at least one of a conductive material and a binder other than the cathode active material.

The cathode active material in the present disclosure is usually an active material that is defluorinated upon discharge. Examples of the cathode active material may include a simple substance of metal, an alloy, a metal oxide, and fluorides of these. Examples of the metal element to be included in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Among them, the cathode active material is preferably Cu, CuF, Fe, FeF, Ag, and $AgF_x$. Incidentally, the x is a real number larger than 0. Also, additional examples of the cathode active material may include carbon materials and fluorides thereof. Examples of the carbon material may include graphite, coke, and carbon nanotube. Also, further additional examples of the cathode active material may include polymer materials. Examples of the polymer material may include polyaniline, polypyrrole, polyacetylene, and polythiophene.

The conductive material is not limited if the material has the desired electron conductivity, and examples thereof may include carbon materials. Examples of the carbon material may include carbon black such as acetylene black, Ketjen black, furnace black, and thermal black. On the other hand, the binder is not limited if it is chemically and electronically stable, and examples thereof may include fluorine-based binders such as polyvinylidene fluoride (PVDF) and polytetra fluoro ethylene (PTFE). Also, the content of the cathode active material in the cathode layer is preferably larger from the viewpoint of the capacity. Also, the thickness of the cathode layer greatly varies with the constitution of the battery, and thus not limited.

3. Anode Layer

The anode layer in the present disclosure is a layer that contains at least an anode active material. Also, the anode layer may further contain at least one of a conductive material and a binder other than the anode active material.

The anode active material in the present disclosure is usually an active material that is fluorinated upon discharge. Also, as the anode active material, an arbitrary active material that has a lower potential than that of the cathode active material may be selected. Accordingly, the above described cathode active material may be used as the anode active material. Examples of the anode active material may include a simple substance of metal, an alloy, a metal oxide, and fluorides of these. Examples of the metal element to be included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, Pb, and $PbF_x$. Incidentally, the x is a real number larger than 0. Also, as the anode active material, the above described carbon materials and polymer materials may be used.

The conductive material and the binder may be the same materials as those described for the cathode layer above. Also, the content of the anode active material in the anode layer is preferably larger from the viewpoint of the capacity. Also, the thickness of the anode layer greatly varies with the constitution of the battery, and thus not limited.

4. Other Constitution

The fluoride ion battery of the present disclosure is a battery comprising at least the above described anode layer, cathode layer, and solid electrolyte layer. The battery usually further comprises a cathode current collector for collecting currents of the cathode layer, and an anode current collector for collecting currents of the anode layer. Examples of the shape of the current collectors may include a foil shape, a mesh shape, and a porous shape. The fluoride ion battery of the present disclosure is usually a solid battery.

5. Fluoride Ion Battery

The fluoride ion battery of the present disclosure is not limited if it has the above described cathode layer, anode layer, and solid electrolyte layer. Also, the fluoride ion battery of the present disclosure may be a primary battery and may be a secondary battery, but preferably a secondary battery among them, so as to be repeatedly charged and discharged and useful as a car-mounted battery for example. Also, examples of the shape of the fluoride ion battery of the present disclosure may include a coin shape, a laminate shape, a cylindrical shape, and a square shape.

D. Method for Producing Fluoride Ion Battery

Figure 5A:
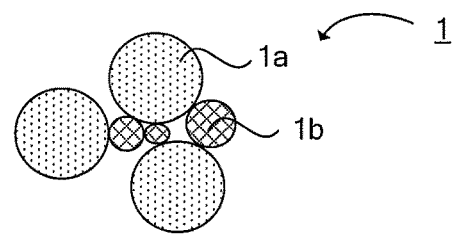
FIGS. 5A to 5C are schematic diagrams illustrating an example of the method for producing the fluoride ion battery of the present disclosure.
Figure 5B:
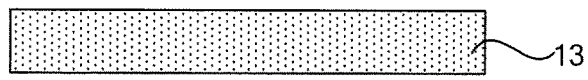
Figure 5C:
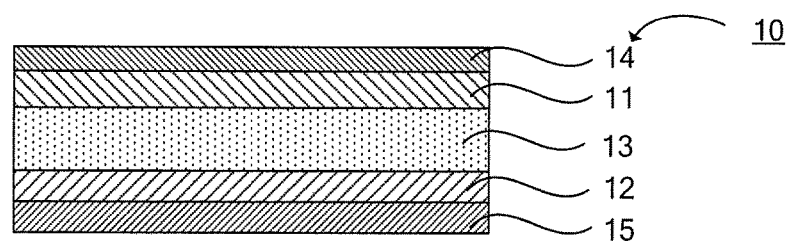

The method for producing the fluoride ion battery of the present disclosure is described with reference to drawings. FIGS. 5A to 5C are schematic diagrams illustrating an example of the method for producing the fluoride ion battery of the present disclosure. The method for producing the fluoride ion battery of the present disclosure comprises: a mixing step of mixing solid electrolyte particle 1a including a crystal phase that has a Tysonite structure and contains an F element, as a main phase, and CsF 1b, to obtain solid electrolyte material 1, as shown in FIG. 5A; and a pressing step of pressing the solid electrolyte material 1 to obtain solid electrolyte layer 13, as shown in FIG. 5B; wherein the CsF content in the solid electrolyte material is 50% by weight or less. In the present disclosure, the method may comprise at least the mixing step and the pressing step. Also, in the present disclosure, the method may further comprise a step of forming cathode layer 11, anode layer 12, cathode current collector 14, and anode current collector 15.

According to the present disclosure, the method comprises the above described mixing step, so that a fluoride ion battery with excellent fluoride ion conductivity at a relatively low temperature may be obtained.

1. Mixing Step

The mixing step in the present disclosure is a step of mixing a solid electrolyte particle including a crystal phase, that has a Tysonite structure and contains an F element, as a main phase, and CsF, to obtain a solid electrolyte material. In the mixing step, a solid electrolyte material with the CsF content of 50% by weight or less may be obtained.

Examples of the method for mixing the solid electrolyte particle and the CsF may include mixing by a mortar, and a ball mill treatment.

The solid electrolyte material to be obtained by the mixing step may be in the same contents as those described in the section "A. Solid electrolyte material" above; thus, the description herein is omitted.

2. Pressing Step

The pressing step in the present disclosure is a step of pressing the solid electrolyte material to obtain a solid electrolyte layer. The pressing pressure may be, for example, in a range of 1 ton/cm$^2$ (10$^3$ kg/cm$^2$) to 5 ton/cm$^2$.

In the pressing step, a heat treatment may be performed and may not be performed, but the former is preferable. The reason therefor is to improve the adhesion of the solid electrolyte particle to the CsF, and improve the grain boundary conduction.

The heat treating temperature is, for example, preferably 50° C. or more, preferably 80° C. or more, and preferably 100° C. or more. Also, the heat treating temperature is, from the viewpoint of inhibiting the deterioration of the solid electrolyte particle, for example, preferably 500° C. or less.

3. Method for Producing Fluoride Ion Battery

The method for producing the fluoride ion battery of the present disclosure is not limited if the method comprises the above described mixing step and pressing step, and for example, may further comprises steps such as a step of forming a cathode layer, an anode layer, a cathode current collector, and an anode current collector, and a step of assembling a solid battery. The fluoride ion battery to be obtained in the present disclosure may be in the same contents as those described in the section "C. Fluoride ion battery" above.

Incidentally, the present disclosure is not limited to the above embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to examples.

Example 1

Synthesis of $La_{0.9}Ba_{0.1}F_{2.9}$ $LaF_3$ and $BaF_2$ were weighed so as to be 9:1 in the molar ratio. The weighed materials were crushed and mixed by ball milling at 600 rpm for 12 hours. The mixed powder was heat treated under an Ar atmosphere at 600° C. for 10 hours. $La_{0.9}Ba_{0.1}F_{2.9}$ was obtained by the above steps.

Production of Solid Electrolyte Material

In a glove box, 10 mg of CsF and 240 mg of the synthesized $La_{0.9}Ba_{0.1}F_{2.9}$ were crushed and mixed by a mortar to obtain a solid electrolyte material.

Production of Evaluation Cell

Figure 6A:
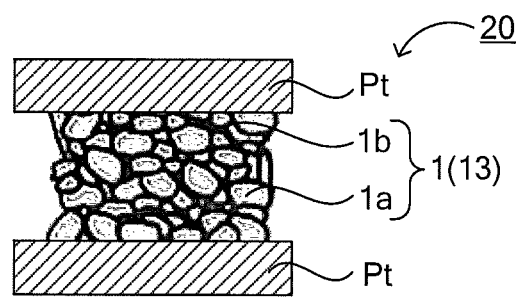
FIGS. 6A and 6B are schematic cross-sectional views of evaluation laminated bodies in Examples and Comparative Examples.

The obtained solid electrolyte material was weighed so as to be 200 mg. The top and bottom of the weighed solid electrolyte material were sandwiched by Pt foils, pressed at 4 ton/cm$^2$ (10$^3$ kg/cm$^2$), and heat treated as in the state at 120° C. for 0.5 hours. Thereby, an evaluation laminated body of a solid electrolyte layer was obtained. FIG. 6A is a schematic cross-sectional view illustrating the evaluation laminated body in Example 1.

Example 2

An evaluation laminated body was produced in the same manner as in Example 1, except that the solid electrolyte material was obtained by crushing and mixing 25 mg of the CsF and 225 mg of the synthesized $La_{0.9}Ba_{0.1}F_{2.9}$ by a mortar in a glove box.

Example 3

An evaluation laminated body was produced in the same manner as in Example 1, except that the solid electrolyte material was obtained by crushing and mixing 50 mg of the CsF and 200 mg of the synthesized $La_{0.9}Ba_{0.1}F_{2.9}$ by a mortar in a glove box.

Example 4

An evaluation laminated body was produced in the same manner as in Example 1, except that the solid electrolyte material was obtained by crushing and mixing 75 mg of the CsF and 175 mg of the synthesized $La_{0.9}Ba_{0.1}F_{2.9}$ by a mortar in a glove box.

Example 5

An evaluation laminated body was produced in the same manner as in Example 1, except that the solid electrolyte material was obtained by crushing and mixing 125 mg of the CsF and 125 mg of the synthesized $La_{0.9}Ba_{0.1}F_{2.9}$ by a mortar in a glove box.

Comparative Example 1

Figure 6B:
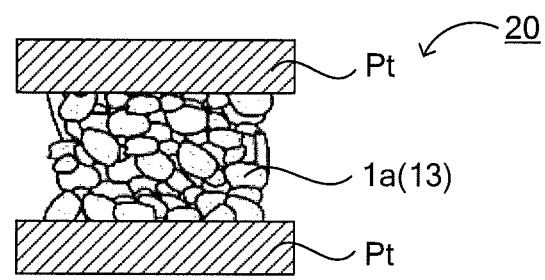

An evaluation laminated body was produced in the same manner as in Example 1, except that the synthesized $La_{0.9}Ba_{0.1}F_{2.9}$ was crushed by a mortar in a glove box and used as the solid electrolyte material. FIG. 6B is a schematic cross-sectional view illustrating the evaluation laminated body in Comparative Example 1.

Comparative Example 2

CsF was crushed by a mortar in a glove box and used as a solid electrolyte material. An evaluation laminated body was obtained in the same manner as in Example 1 except that the crushed CsF was weighed so as to be 200 mg.

[Evaluation]

Ion Conductivity Measurement

The evaluation laminated bodies in Example 2 and Comparative Example 1 were measured by an alternating current impedance method (measurement temperature: 80° C., 110° C., 140° C., and 200° C.; applied voltage: 5 mV; measurement frequency ranges: 0.01 MHz to 1 MHz), and the fluoride ion conductivity was calculated from the thickness of the solid electrolyte layer and the resistance value on the real axis of the Cole-Cole plot.

Activation Energy Evaluation

Figure 7:
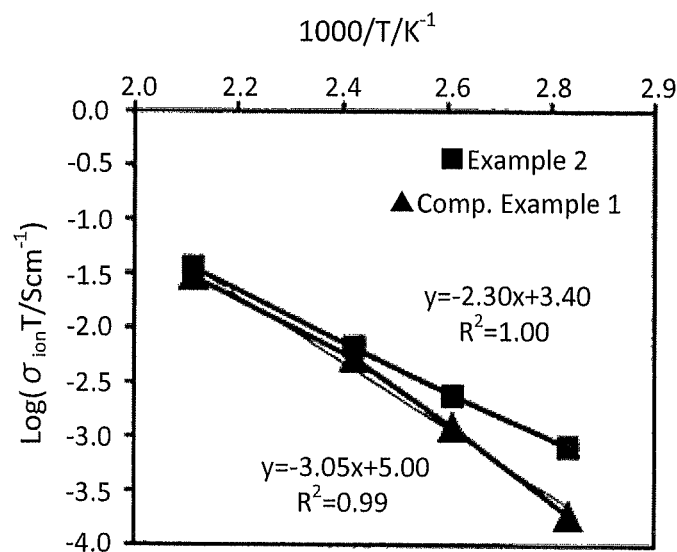
FIG. 7 is the result of the fluoride ion conductivity measurement in Example 2 and Comparative Example 1.

Regarding Example 2 and Comparative Example 1, the activation energy of the fluoride ion conduction in the entire solid electrolyte layer was calculated from the result of the above described ion conductivity evaluation. In particular, the graph of the Arrhenius plot shown in FIG. 7 was prepared using the measured ion conductivity, and the activation energy Ea was calculated from the incline of the obtained graph using the following formula:

$$Ea = (\text{absolute value of incline}) \times R \times 1000$$

(in the formula, R is a fixed number (R=8.3145 J/K·mol)).

The result is shown in Table 1.

TABLE 1

| | Ion conductivity (S/cm) | | | | Ea |
|---|---|---|---|---|---|
| | 80° C. | 110° C. | 140° C. | 200° C. | (kJ/mol) |
| Example 2 | $2.30 \times 10^{-6}$ | $6.14 \times 10^{-6}$ | $1.61 \times 10^{-5}$ | $7.55 \times 10^{-5}$ | 19.12 |
| Comparative Example 1 | $5.37 \times 10^{-7}$ | $3.15 \times 10^{-6}$ | $1.28 \times 10^{-5}$ | $6.27 \times 10^{-5}$ | 25.36 |

From the result of Example 2 and Comparative Example 1, it was confirmed that the ion conductivity at a relatively low temperature of approximately 80° C. was improved by mixing the CsF with the solid electrolyte particle.

Also, from the result of Example 2 and Comparative Example 1, it was found out that the activation energy of the fluoride ion conduction in the entire solid electrolyte layer was reduced by mixing the CsF.

Correlation Between CsF Mixture Rate and Activation Energy

For the evaluation laminated bodies in Examples 1, 3 to 5, and Comparative Example 2, the ion conductivity was measured in the same manner as for Example 2 and Comparative Example 1 at each temperature, and the activation energy was calculated. The correlation between the CsF mixture rate and the activation energy Ea is shown in Table 2 and FIG. 8. Incidentally, $y=0.00123x^2-0.5918x+23.855$ in FIG. 8 is an approximate formula of the plot.

TABLE 2

| | Mixture rate (weight %) | Ea (kJ/mol) |
|---|---|---|
| Comparative Example 1 | 0 | 25.36 |
| Example 1 | 4 | 19.22 |
| Example 2 | 10 | 19.12 |
| Example 3 | 20 | 17.98 |
| Example 4 | 30 | 17.91 |
| Example 5 | 50 | 24.13 |
| Comparative Example 2 | 100 | 87.80 |

Figure 8:
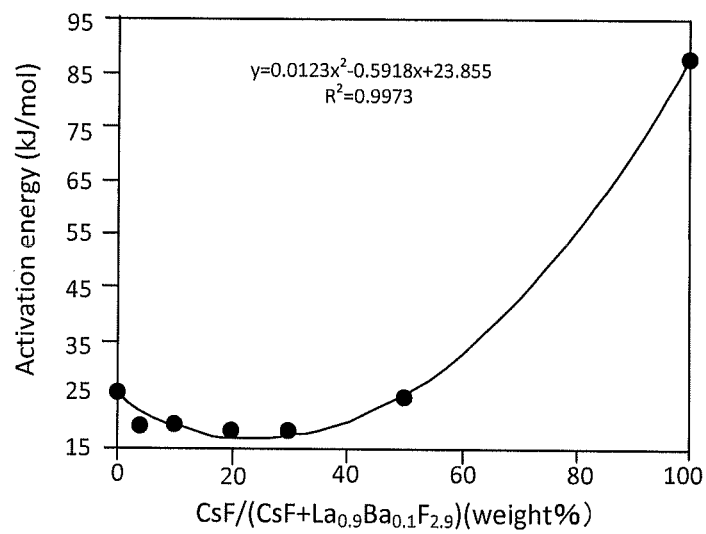
FIG. 8 is the result of correlation between the CsF mixture rate and the activation energy.

From the result of Comparative Example 2 (CsF: 100% by weight) in Table 2 and FIG. 8, the CsF itself had extremely high activation energy. Also, the ion conductivity could not be measured in the relatively low temperature region (such as 80° C.), and thus it was confirmed that the ion conductivity was extremely low. Accordingly, it was confirmed that the improvement of the ion conductivity at a low temperature was not due to the physical property of the CsF. In the present disclosure, the CsF was mixed in the grain boundary at a small amount, so that the conductivity along the grain boundary specifically improved, which presumably lead the decrease of the activation energy.

Also, it was confirmed that the effect of improving the ion conductivity at a low temperature was obtained with the CsF content in the solid electrolyte material being 50% by weight or less. Also, it was confirmed that the activation energy became the smallest when the content was 20% by weight to 30% by weight.

XRD Measurement

A powder XRD measurement was conducted for the solid electrolyte material in Example 2 by filling the material in an XRD glass holder.

Figure 9:
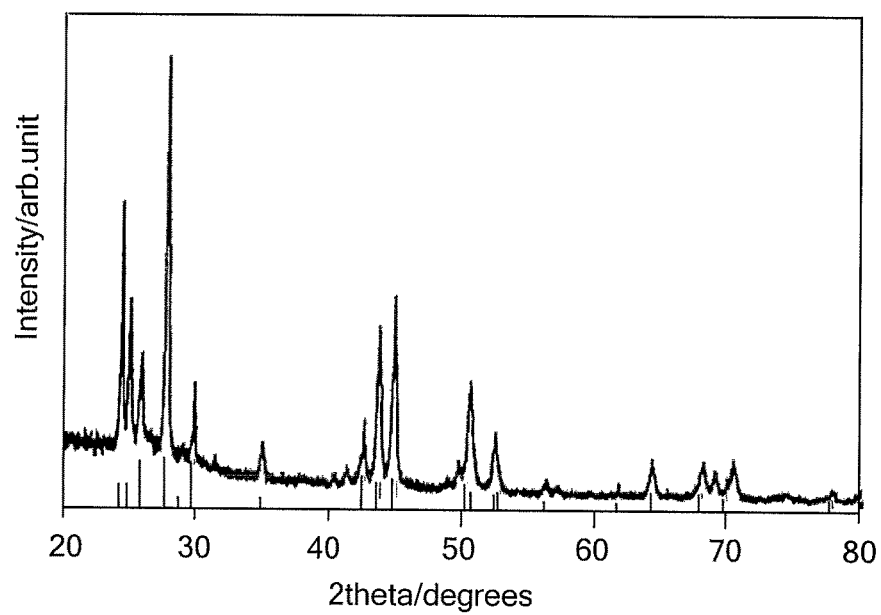
FIG. 9 is the result of the XRD measurement in Example 2.

The measurement was conducted using a CuKα ray, $2\theta=20°$ to 80°, and scanning rate of 10°/min. The result is shown in FIG. 9.

It was confirmed that the solid electrolyte material in Example 2 had peaks at the positions of $2\theta=24.34°$, 24.88°, 27.72°, 28.66°, 34.89°, 40.23°, 43.6°, 44.73°, 50.48°, 52.39°, and 64.29°. These peak positions were almost equal to the peak positions of $La_{0.9}Ba_{0.1}F_{2.9}$.

Also, it was confirmed that the solid electrolyte material in Example 2 had peaks in almost the same positions as those of the CsF ($2\theta=25.63°$, 29.68°, 42.48°, 50.28°, 52.68°, 61.64°, 67.88°, 69.89°, and 77.73°).

REFERENCE SIGNS LIST 1a solid electrolyte particle
1b CsF
1 solid electrolyte material
11 cathode layer
12 anode layer
13 solid electrolyte layer
14 cathode current collector
15 anode current collector
10 fluoride ion battery

What is claimed is:

1. A solid electrolyte material to be used for a fluoride ion battery, the solid electrolyte material comprising:
   a solid electrolyte particle including a crystal phase, that has a Tysonite structure and contains an F element, as a main phase; and CsF; and
   the CsF content in the solid electrolyte material is 50% by weight or less.

2. The solid electrolyte material according to claim 1, wherein the crystal phase has a composition represented by $Ln_{1-x}M_xF_{3-x}$, in which Ln is a lanthanoid metal, M is an alkali earth metal, and x satisfies $0 \leq x \leq 0.2$.

3. The solid electrolyte material according to claim 1, wherein the CsF content in the solid electrolyte material is in a range of 20% by weight to 30% by weight.

4. A solid electrolyte layer to be used for a fluoride ion battery, the solid electrolyte layer comprising the solid electrolyte material according to claim 1.

5. A fluoride ion battery comprising: a cathode layer, an anode layer, and a solid electrolyte layer formed between the cathode layer and the anode layer, wherein
   the solid electrolyte layer contains the solid electrolyte material according to claim 1.

6. A method for producing a fluoride ion battery, the method comprising:
   a mixing step of mixing a solid electrolyte particle including a crystal phase, that has a Tysonite structure and contains an F element, as a main phase, and CsF, to obtain a solid electrolyte material; and
   a pressing step of pressing the solid electrolyte material to obtain a solid electrolyte layer; wherein
   the CsF content in the solid electrolyte material is 50% by weight or less.

7. The method for producing a fluoride ion battery according to claim 6, wherein a heat treatment is performed in the pressing step.

\* \* \* \* \*